No. 702,560. Patented June 17, 1902.
W. R. JEAVONS.
OIL BURNER.
(Application filed Aug. 18, 1900.)
(No Model.) 2 Sheets—Sheet 1.

ATTEST  
INVENTOR  
William R. Jeavons  
BY W. T. Fisher ATTY

No. 702,560. Patented June 17, 1902.
W. R. JEAVONS.
OIL BURNER.
(Application filed Aug. 18, 1900.)

(No Model.) 2 Sheets—Sheet 2.

ATTEST
R. B. Moser
M. A. Sheehan

INVENTOR.
William R. Jeavons

By H. J. Fisher ATTY

THE NORRIS PETERS CO., PHOTO-LITHO., WASHINGTON, D. C.

UNITED STATES PATENT OFFICE.

WILLIAM R. JEAVONS, OF CLEVELAND, OHIO.

OIL-BURNER.

SPECIFICATION forming part of Letters Patent No. 702,560, dated June 17, 1902.

Application filed August 18, 1900. Serial No. 27,266. (No model.)

*To all whom it may concern:*

Be it known that I, WILLIAM R. JEAVONS, a citizen of the United States, residing at Cleveland, in the county of Cuyahoga and State of Ohio, have invented certain new and useful Improvements in Oil-Burners; and I do declare that the following is a full, clear, and exact description of the invention, which will enable others skilled in the art to which it appertains to make and use the same.

My invention relates to that class of burners in which the oil is vaporized in a trough and the vapor therefrom burned above said trough in a combustion-chamber formed by perforated walls.

The object of this invention is to provide a simple and efficient stove having certain novel and desirable features, all substantially as hereinafter described, and particularly pointed out in the claims.

Figure 1:
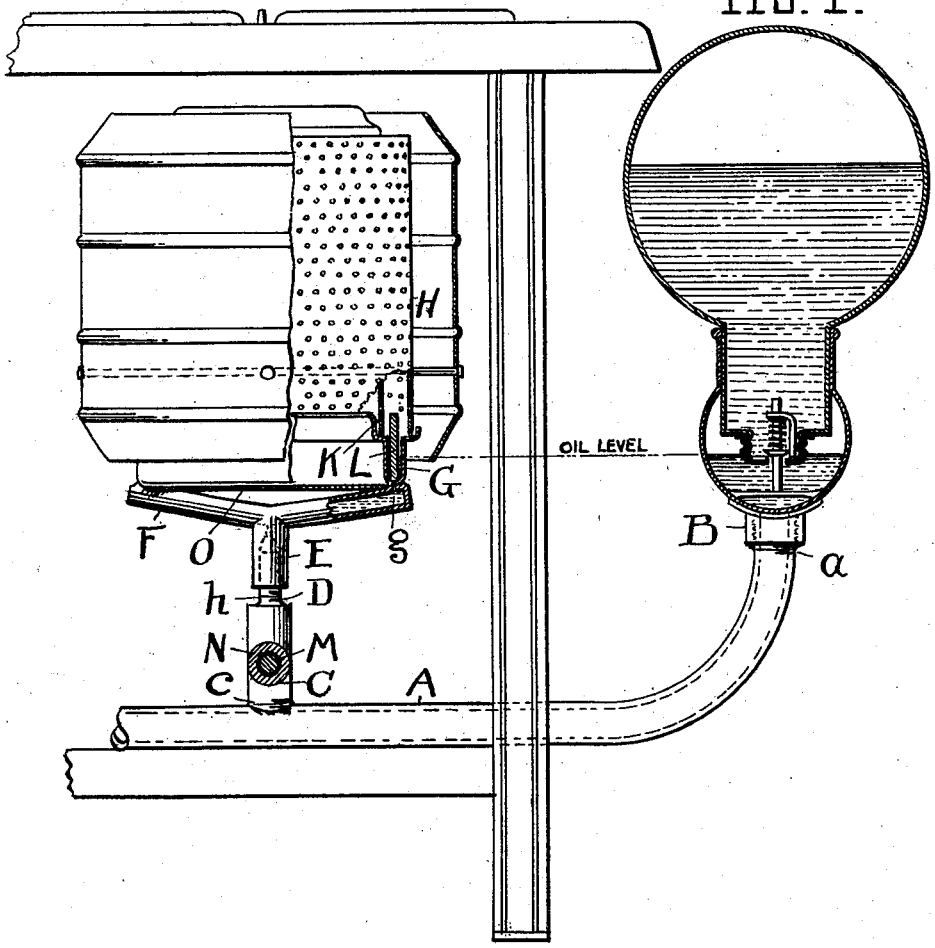
Figure 2:
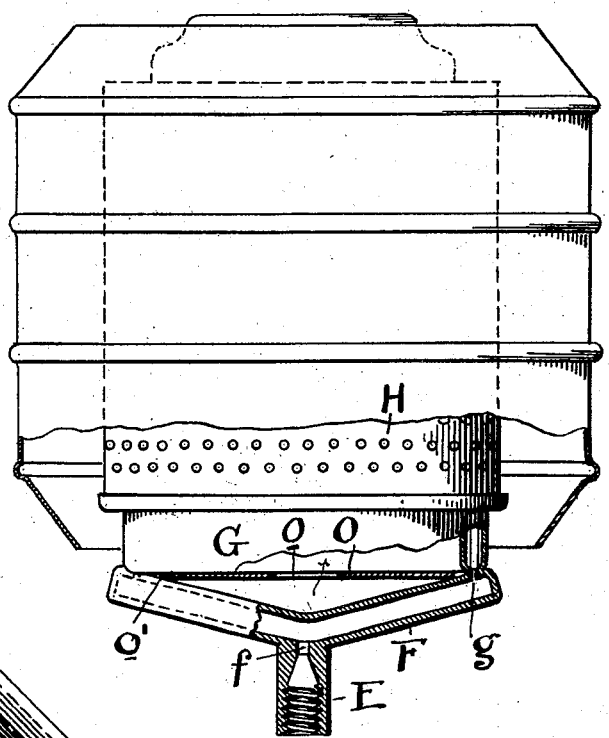
Figure 4:
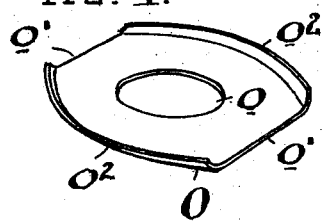
Figure 3:
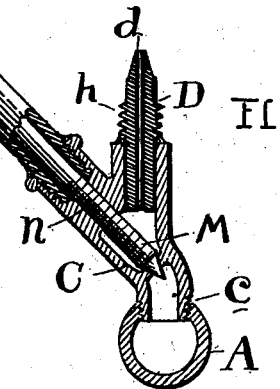

Figure 1 is a front elevation, partly in section, showing the relation of the several parts. Fig. 2 is a side elevation of the trough and the burner-tubes thereon. Fig. 3 is a cross-section showing the valved burner-support. Fig. 4 is a perspective view of the diaphragm or plate O.

In Fig. 1, A is an oil-supply pipe threaded at $a$.

C is a valve-body adapted to screw into the pipe A, as shown, the said pipe being drilled and threaded for the reception of said valve-body. Into the upper portion of the valve-body C a threaded plug D is fixed. This plug extends upward, and its upper end is turned into conical shape on the plan of a needle-valve. A small hole or bore extends from the top of said conical portion down through the entire length of the plug, so that oil from the pipe A through valve-body C will pass through and out of the top of said plug. A member E is hollowed out and threaded internally for engaging the threads of the said plug D and has a seat at its upper portion against which the conical portion of plug D seats, the lower internal portion of E being threaded and adapted to screw on the threads of the plug D for bringing its upper or seat portion in close contact with the conical portion of plug D. This arrangement of the threaded plug D and member E, in effect, forms a valve with a passage-way through its stem. Above the sleeve E and brazed or soldered thereto is a pipe F, which is in turn brazed or otherwise secured to the burner-trough G, and there are openings from the trough G into the ends of said pipe F, as shown at $g$, and an opening from the pipe F at $f$, which communicates with the opening through the plug D.

The opening into the pipe F at $f$ is larger than the opening $g$ from the said pipe into the trough G, and the opening $d$ through the plug D is made smaller than the opening from the pipe into the trough at $g$. The object of making the hole $f$ larger than the hole $g$ is to promote or permit the passage therethrough of any dirt or foreign substance that may enter the pipe through hole $g$, and the object of making the orifice $d$ smaller than the orifice $g$ is that the larger pieces of dirt and foreign matter will not pass through the opening $d$ to the valve, but will be retained in the pipe F until on the uncoupling of the trough and member E from the plug D such dirt or foreign matter may escape from the opening $f$. From this construction it will be seen that the trough G, together with the pipe F and member E, may be readily removed from the valve-plug D by simply unscrewing from said plug and that any large dirt particles entering pipe F will not pass down into the valve-body through the small opening $d$, but will be retained in the said pipe until the trough and pipes are unscrewed from plug D. Any dirt particles which are small enough to go through passage $d$ will readily pass through the valve-orifice, which is larger than the passage $d$. On replacing the trough and attached parts a simple turning around of the said trough until the plug D fits in its seat in the member E will join these parts together in a manner much like the shutting off of a valve, and the joints between said parts will be perfectly closed and oil-tight.

The walls H and K of the combustion-chamber are perforated with numerous small air-inlet openings spaced in a symmetrical manner throughout the body of said walls. A lighting-ring L rests in the trough and extends up between the lower portion of the chamber-walls.

It will be noticed in Fig. 1 that the stem supporting the burner has a materially-reduced portion $h$ comprised, in this instance, in the plug D. This novel construction enables one to accurately level the burner-bowl after all the parts are connected up, if it be not already level, by simply bending the stem in the required direction and to the required degree to effect this purpose. Ordinarily this may not be required, and yet it not uncommonly occurs when a stove is delivered that one or more burners are found uneven or more or less distorted in position, and if provision be not made in the neck for setting it aright the connections have to be taken apart and much trouble and labor are required to get it righted; but by making provision for this trouble, as described, a burner can be leveled up in a few moments.

The oil-tank is of the student-lamp type, in which the oil therein is maintained at a constant level in the lower tank or receptacle, the upper tank or reservoir being in position above the lower tank and having a tubular portion projecting into the lower tank. At the bottom of this tubular portion is the orifice through which the oil escapes and which is closed by a spring-valve when the upper reservoir is removed, but which is held open when in position in the lower tank. The tubular portion of the upper reservoir is of such size as to slip loosely into the sleeving portion of the lower tank, so that the upper reservoir may be easily removed for filling and also so that air may enter the lower tank. The oil-conveying pipe A connects with the bottom of the lower tank.

The valve-body C and parts thereabove, upon which the trough is mounted, are arranged of such height as to support the trough, so that the oil will rise in said trough about half-way to its top, as shown in Fig. 1. The valve-body C has the valve or valve-stem M in this instance disposed at an angle of about forty-five degrees from the upright trough-supporting portion. A stem-sleeve N envelops the said stem and extends upward, so that its upper end is above the line of oil-level in the tank and trough, rendering packing around the valve-stem unnecessary, as oil leaking through the threads $n$ cannot run out of the top end of said valve-sleeve.

The valve-stem M is threaded at $n$ to engage with threads in the valve-body at this point and is of such diameter as to about fill the bore of the sleeve or casing N. When the said stem is revolved sufficiently to disengage its threaded portion from the body of the valve, it may be moved to and fro in the casing N and will act to agitate the oil somewhat after the manner of a pump-plunger, alternately drawing and forcing it through the valve-orifice and through passage $d$ in the plug D, and in this way the said passages may be flushed and any dirt or water that may have accumulated therein will be dislodged.

At the bottom of trough G is a diaphragm O, as shown in Fig. 2. It is set in this portion to shield the inner walls from upward currents of cool air and so that heat radiated from the interior of the burner-tubes will be intercepted at this point, and the inner walls of the trough being housed in by this diaphragm become hotter than would occur without such diaphragm. An air opening or openings $o$, preferably of just the size to supply the requisite air for the interior of the burner, is made in this diaphragm. Said diaphragm is kept in its position by being forced between the pipe F and the bottom of the trough, portions of its periphery on opposite sides being cut off at $o'$ to escape the end of the pipe F where it joins the trough, the rest of the periphery of the diaphragm being turned up or flanged as shown at $o^2$ in Fig. 4. When the diaphragm is in place, the portions $o' o'$ bear on the pipe to keep it close against the bottom of the trough, and the flanges $o^2 o^2$ bear upward and embrace the rounded bottom of the trough, the normal spring in the sheet metal of which the diaphragm is composed tending to keep it in close contact with the bottom of the trough and secure against lateral displacement.

What I claim is—

1. In an oil-stove, the combination of an oil-supply tank provided with means for the maintenance of a substantially constant level of oil therein, a burner-trough with its upper edge above the plane of the maintained oil-level in said tank, a supply-pipe between said tank and trough, and a valve and stem to control the outflow therefrom, and a sleeve for said valve-stem extending upwardly to a plane above the maintained level of oil in said tank and open at its top, the said valve-stem adapted to be reciprocated in said sleeve, whereby the contents of the oil-passages may be forcibly ejected and the said passages cleansed with the head of oil open to the burner-trough, substantially as described.

2. In an oil-stove, the combination of an oil-supply tank provided with means for the maintenance of a constant level of oil therein, a burner-trough in position with its top edges above the level of oil in said tank, an oil-feed pipe projecting downwardly from said trough and a valve below said feed-pipe controlling the flow of oil to the burner-trough, a supply-pipe for the said trough below said valve, and a sleeve for the said valve extending upwardly to a point above the level of oil in the said tank, said valve adapted to be reciprocated and to serve as a piston to force oil through the oil-passages leading to the burner-trough, substantially as described.

3. The combination of an oil-supply tank and means for the maintenance of a substantially constant level of oil therein, a burner-trough and a valve-body and oil-supply connections from the tank to said body and thence to the burner-trough, a sleeve projecting from said valve-body having its upper end above the maintained oil-level in the tank and a plunger in said sleeve adapted to force oil forward through the oil-passages, substantially as described.

4. The combination of an oil-supply tank and means for the maintenance of a substantially constant level of oil therein, a burner-trough with its top edges above the maintained level of the oil in said tank and a valve-body and oil-supply connections from the tank to said body and thence to the burner-trough, a sleeve projecting from said body having its upper end above the maintained oil-level in the tank and a plunger in said sleeve adapted to force oil forward through the oil-passages, substantially as described.

5. In an oil-stove, the combination of an oil-supply tank and means for the maintenance of a substantially constant level of oil therein, a burner-trough with its top edges above the level of the oil in said tank, and an oil-supply passage from the tank to the said burner, a tubular sleeve open to said passage and having its upper end above the maintained level of the oil in the supply-tank, and means adapted to be reciprocated in said sleeve and to force oil to the burner-trough, substantially as described.

6. In an oil-stove, the combination of an oil-supply tank and means for the maintenance of a substantially constant level of oil therein, a burner-trough with its top edges above the plane of the constant oil-level of said oil-supply, a valve-body below said trough and in open connection therewith through an upwardly-extending part, a tube for the valve-stem extending outwardly and upwardly from said valve-body with its top end above the plane of the said constant oil-level, and a valve-stem supported in said tube, said parts constructed and arranged to allow the reciprocation of the valve-stem in the said tube, substantially as described.

7. In a burner, perforated tubes forming a combustion-chamber between them, an annular vapor-trough supporting said tubes, a transversely-arranged oil-supply pipe supporting said vapor-trough and open thereto at its ends, and a heat-radiating plate spanning the space at the bottom of the trough, whereby vaporization of the oil in the vapor-trough is promoted, substantially as described.

Witness my hand to the foregoing specification this 10th day of August, 1900.

WILLIAM R. JEAVONS.

Witnesses:
H. T. FISHER,
R. B. MOSER.